United States Patent Office 3,715,273
Patented Feb. 6, 1973

3,715,273
NUCLEAR FUEL ELEMENT CONTAINING SINTERED URANIUM DIOXIDE FUEL WITH A FINE PARTICULATE DISPERSION OF AN OXIDE ADDITIVE THEREIN, AND METHOD OF MAKING SAME
Frank Rigby, Blackpool, and John Brian Ainscough, Fulwood, England, assignors to United Kingdom Atomic Energy Authority, London, England
No Drawing. Filed Dec. 8, 1969, Ser. No. 883,315
Claims priority, application Great Britain, Dec. 16, 1968, 59,814/68
Int. Cl. G21c 3/06
U.S. Cl. 176—67                                    11 Claims

ABSTRACT OF THE DISCLOSURE

Sintered uranium dioxide containing an additive of for example magnesium oxide or aluminum oxide, the additive being dispersed in fine particulate form within the grains of uranium dioxide.

A method is also disclosed for preparing such a material in which the uranium dioxide containing the additive is sintered in an oxidising atmosphere, for example 0 to 50% hydrogen in carbon dioxide to convert the material to a hyperstoichiometric uranium dioxide in which the additive is soluble. The material is then heated in a reducing atmosphere for example of hydrogen to convert the material to stoichiometric uranium dioxide in which the additive is insoluble whereby the additive is released from solution in the material dispersed in fine particulate form within the grains of the uranium dioxide.

BACKGROUND OF THE INVENTIION

This invention relates to ceramics.

The invention is particularly concerned with ceramic fissile materials for use as fuel in a nuclear reactor. When such ceramic fissile materials as uranium or plutonium dioxides or mixtures of these oxides are irradiated for long periods of time at high temperatures stable gaseous fission products, in particular xenon and krypton, are produced by fission and are released from the ceramic material at a rate which is determined by the temperature of the material. Such gas release from ceramic nuclear fuel material is undesirable. For example in the case of a fuel element in which the fuel material is held within an outer gas tight container a high gas pressure will be set up in the container and there is a risk that the container will be strained to failure. Also the formation of bubbles of the gaseous fission products at the grain boundaries in the fuel material leads to swelling of the fuel material with consequent straining and possible failure of the container. Further it is usual to include a quantity of helium gas in the container in order to assist the transfer of heat from the fuel material to the container. The pressure of released gases such as xenon and krypton is additive to the pressure of the helium. Also the addition of the released gases to the helium results in a reduction in its thermal conductivity which may result in over-heating of the fuel material.

It is known to provide small amounts of additives such as yttria, iridium and neodymium oxides in ceramic nuclear fuel materials such as uranium dioxide in order to inhibit the release of gaseous fission products from such nuclear fuel materials. The additive material is mixed in fine powder form with powder of the nuclear fuel material prior to pressing and sintering of the nuclear fuel material to form solid bodies of the material. These known additives have been found to be not as effective as desirable in inhibiting the release of gaseous fission products from the nuclear fuel material when irridiated in a nuclear reactor, probably because the additives are located mainly at the grain boundaries in the sintered nuclear ing of the fuel material.

It is also known to provide small amounts of magnesium oxide as an additive in oxide nuclear fuel particles such as thorium oxide or thorium-uranium oxide in order to improve the dissolution properties of the fuel particles in acid media during chemical processing of the fuel particles after irradiation in a nuclear reactor.

SUMMARY OF THE INVENTION

According to the present invention a ceramic fissile material of polycrystalline form is provided containing an additive which is insoluble in the ceramic fissile material and which is dispersed in fine particulate form within the grains of the ceramic fissile material.

This fine dispersion of the additive within the grains of the ceramic fissile material has been found to be more effective in inhibiting the release of gaseous fission products from the material than is the case with the additives previously proposed. The fine dispersion of the additive within the grains of the ceramic fissile material is thought to act as pinning or nucleating sites for gas bubbles so preventing movement of the gaseous fission products to grain boundaries, bubble linkage and consequent gas release.

Magnesium oxide is a suitable additive in amount 0.15 to 3.7 weight percent the preferred range being 0.75 to 2.0 weight percent.

Another suitable additive is aluminum oxide in amount 0.15 to 3.3 weight percent the preferred range also being 0.75 to 2.0 weight percent.

The invention also relates to a method for preparing a sintered ceramic fissile material of polycrystalline form containing an additive which is dispersed in fine particulate form within the grains of the ceramic material.

The method is based on the discovery that in the case of certain ceramic fissile materials which can exist in two states an additive can be specified which is soluble in one state of the ceramic material and insoluble in the other state of the material.

In accordance with this aspect of the invention the ceramic fissile material containing the additive is prepared in the state in which the additive is soluble in the ceramic fissile material and, subsequent to sintering, the ceramic fissile material is converted to the state in which the additive is insoluble in the ceramic fissile material so that the additive is released from solution in the ceramic fissile material in fine particulate form within the grains of the ceramic fissile material.

In particular the method is based on the discovery that in the case of certain ceramic fissile oxide materials, the cations of which can exist in two valency states, an additive can be specified which is soluble in the oxidised hyperstoichiometric form of the ceramic material but insoluble in the reduced stoichiometric form of the material. For example the uranium ion can exist in the tetravalent or hexavalent state. In the tetravalent state the uranium ion has an ionic radius of 0.97 angstroms, whilst in the hexavalent state the ionic radius is 0.80 angstroms. Thus for example in stoichiometric uranium dioxide with the uranium ions wholly or partly in the tetravalent state certain other oxides such as magnesium oxide or aluminum oxide are insoluble, one of the reasons for this insolubility being the fact that their cations are too large with respect to that for tetravalent uranium for solution to be possible. If however the uranium dioxide is oxidised to the hyperstoichiometric form with the uranium ions wholly or partly in the hexavalent state this difference between the ion sizes becomes less and solution becomes possible. The extent of solubility appears to be dependent on the extent to which the tetravalent uranium ions have been oxidised to the hexavalent state.

According to this aspect of the invention a ceramic fissible oxide material containing an additive is sintered in an oxidising atmosphere to convert the material to a hyperstoichiometric form in which the additive is soluble, the sintered fissile oxide material then being heated in a reducing atmosphere to convert the material to the stoichiometric form in which the additive is insoluble, whereby the additive is released from solution in the material dispersed in fine particulate form within the grains of the material.

In the case for example of uranium dioxide, sintering may be carried out in an oxidising atmosphere of 0 to 50% hydrogen in carbon dioxide at a temperature in the range 1400° C. to 1600° C. the material then being heated in a reducing atmosphere of hydrogen at a temperature in the range 1200° C. to 1400° C.

DESCRIPTION OF THE PREFERRED EMBODIMENTS

The following are examples of the method of the invention relating to the production of bodies of sintered uranium dioxide containing additions of magnesium oxide.

EXAMPLE I

Uranium dioxide powder intimately mixed with 0.75 weight percent magnesium oxide powder is pressed into pellets and the pellets are sintered at 1400° C. for 2 hours in an atmosphere of 50% hydrogen/50% carbon dioxide to produce pellets of density above 10 grams/cubic centimetre. This atmosphere is slightly oxidising so that the uranium dioxide is oxidised to the hyperstoichiometric form. Magnesium oxide is soluble in hyperstoichiometric uranium dioxide so that the magnesium oxide is taken into solution by the uranium dioxide. The sintered pellets are subsequently heated in pure hydrogen for twelve hours at 1200° C. which reduces the hyperstoichiometric uranium dioxide to the stoichiometric form. As magnesium oxide is insoluble in stoichiometric uranium dioxide this causes precipitation of the magnesium oxide predominantly within the grains of the uranium dioxide, on a fine scale of approximately $10^{16}$ particles/cubic centimetre. The reduction temperature of 1200° C. is sufficiently low for grain growth not to occur as otherwise the precipitate of magnesium oxide may be swept from within the grains to the grain boundaries as grain growth occurs.

EXAMPLE II

Uranium dioxide powder intimately mixed with 1.0 weight percent of magnesium oxide powder is pressed into pellets and the pellets are sintered at 1600° C. for 24 hours in an atmosphere of 5% hydrogen/95% carbon dioxide. The sintered pellets are subsequently heated in pure hydrogen for twelve hours at 1400° C. producing as in Example I pellets having a fine dispersion of magnesium oxide predominantly within the grains of the uranium dioxide.

EXAMPLE III

Uranium dioxide powder intimately mixed with 2.0 weight percent magnesium oxide powder is pressed into pellets and the pellets are sintered at 1600° C. in pure carbon dioxide it being ensured that oxygen is not present as a significant impurity in the carbon dioxide. The sintered pellets are subsequently heated in pure hydrogen for twelve hours at 1400° C.

The above examples cover the preferred range of 0.75 to 2 weight percent magnesium oxide additions to uranium dioxide although additions of magnesium oxide from a lower limit of 0.15 weight percent, up to the theoretical limit of solubility of 3.7 weight percent in uranium dioxide are possible.

As for the gas compositions used for the sintering atmosphere a range of 0–85% hydrogen in carbon dioxide is possible although the above examples cover the preferred range of 0–50% hydrogen in carbon dioxide. The preferred range of sintering temperatures is 1400°–1600° C. although sintering is possible in the range 1200° C.–2000° C., the temperature of 2000° C. being the upper limit of sintering temperature as liquid phases are thought to occur in the magnesium oxide/uranium dioxide system at about 2100° C.

The above examples also cover the preferred range of hydrogen reduction temperatures i.e. 1200° C.–1400° C. having in mind that the reduction step must be carried out at a lower temperature than the sintering step.

As a further example of the method of the invention relating to the production of bodies of sintered uranium dioxide containing additions of aluminum oxide, ammonium diuranate is coprecipitated with 1.0 weight percent aluminum hydroxide by the addition of ammonia to a solution of uranium nitrate and aluminum nitrate. The precipitate is calcined at 800° C. and reduced in hydrogen at 700° C. and the resulting powder which consists of uranium dioxide containing approximately 1.0 weight percent aluminum oxide is pressed into pellets and the pellets are sintered for 24 hours in an atmosphere of 5% hydrogen/95% carbon dioxide at a temperature of 1600° C. The aluminum oxide is taken into solution by the hyperstoichiometric uranium dioxide which is formed. The sintered, but hyperstoichiometric pellets are subsequently heated in pure hydrogen for 6 hours at 1400° C. which reduces the hyperstoichiometric uranium dioxide to the stoichiometric form. As aluminum oxide is insoluble in stoichiometric uranium dioxide this causes precipitation of the aluminum oxide predominantly within the grains of the uranium dioxide in the form of very small particles approximately 20 angstroms in diameter.

As in the case of magnesium oxide additions the preferred range of aluminum oxide additions is 0.75 to 2.0 weight percent, although additions of aluminum oxide from a lower limit of 0.15 weight percent up to the theoretical limit of solubility of 3.3 weight percent are possible.

Also the preferred range of gas compositions for sintering is 0–50% hydrogen in carbon dioxide within the possible broader range 0–85% hydrogen in carbon dioxide.

Sintering temperatures may be in the range 1200° C.–1900° C. the preferred range again being 1400°–1600° C., with a corresponding preferred temperature range of 1200° C.–1400° C. for the hydrogen reduction step.

In general species of oxide which will be suitable additions to uranium dioxide will probably have metal ion radii in the range 0.50 to 0.75 angstroms, will have high melting/boiling points and will have one valence state. Multivalent ions raise the complication that when the uranium oxide is oxidised or reduced they may follow suit changing ion size as they do. Another suitable oxide addition meeting the above requirements is thought to be scandium oxide.

We claim:

1. A nuclear fuel element comprising a gas tight container in which nuclear fuel is held, said fuel comprising ceramic fissile oxide material of polycrystalline form consisting essentially of sintered uranium dioxide containing a solid oxide additive soluble in a hyperstoichiometric form of uranium dioxide but insoluble in stoichiometric uranium dioxide, said oxide additive being dispersed in fine particulate form within the grains of the uranium dioxide.

2. A nuclear fuel element as claimed in claim 1 containing as the additive magnesium oxide in the range 0.75 to 2.0 weight percent.

3. A nuclear fuel element as claimed in claim 1 containing as the additive aluminum oxide in the range 0.15 to 3.3 weight percent.

4. A nuclear fuel element as claimed in claim 1 containing as the additive aluminum oxide in the range 0.75 to 2.0 weight percent.

5. In a method of preparing a sintered ceramic fissile oxide material of crystalline form comprising uranium dioxide and containing an additive which is dispersed in fine particulate form within the grains of the uranium dioxide, wherein a mixture of uranium dioxide and a solid oxide additive soluble in a hyperstoichiometric form of uranium dioxide but insoluble in stoichiometric uranium dioxide is sintered at elevated temperature in an oxidizing atmosphere to bring the oxide additive into solution in hyperstoichiometric uranium dioxde and the hyperstoichiometric uranium dioxide is then heated at a temperature lower than the sintering temperature and sufficiently low that substantially no grain growth occurs in a reducing atmosphere to convert the uranium dioxide to form in which the oxide additive is insoluble.

6. A method for preparing a sintered ceramic fissile oxide material as claimed in claim 1 wherein the additive is magnesium oxide in amount 0.15 to 3.7 weight percent.

7. A method for preparing a sintered ceramic fissile oxide material as claimed in claim 1 wherein the additive is aluminum oxide in amount 0.15 to 3.3 weight percent.

8. A method for preparing a sintered ceramic fissile oxide as claimed in claim 6 wherein the material is sintered in an oxidising atmosphere comprising 0 to 85% hydrogen in carbon dioxide in the temperature range 1200° C.–2000° C. and the material is then heated in a reducing atmosphere of hydrogen at a temperature below the temperature of sintering to convert the material to the stoichiometric form.

9. A method for preparing a sintered ceramic fissile oxide as claimed in claim 7 wherein the material is sintered in an oxidising atmosphere comprising 0 to 85% hydrogen in carbon dioxide in the temperature range 1200° C.–1900° C. and the material is then heated in a reducing atmosphere of hydrogen at a temperature below the temperature of sintering to convert the material to the stoichiometric form.

10. A method for preparing a sintered ceramic fissile oxide material as claimed in claim 1 wherein the additive is magnesium oxide in amount 0.75 to 2.0 weight percent, the material being sintered in an oxidising atmosphere comprising 0 to 50% hydrogen in carbon dioxide in the temperature range 1400° C. to 1600° C. and the material then being heated in a reducing atmosphere of hydrogen at a temperature lower than the sintering temperature in the range 1200° C.–1400° C.

11. A method for preparing a sintered fissile oxide material as claimed in claim 1 wherein the additive is aluminum oxide in amount 0.75 to 2.0 weight percent, the material being sintered in an oxidising atmosphere comprising 0 to 50% hydrogen in carbon dioxide in the temperature range 1400° C.–1600° C. and the material then being heated in a reducing atmosphere of hydrogen at a temperature lower than the sintering temperature in the range 1200° C.–1400° C.

References Cited

UNITED STATES PATENTS

| | | | |
|---|---|---|---|
| 3,472,734 | 10/1969 | Boettcher | 176—67 X |
| 3,309,323 | 3/1967 | Russell et al. | 264—0.5 X |
| 3,472,709 | 10/1969 | Quatinetz et al. | 148—126 |
| 3,278,655 | 10/1966 | Barr | 23—355 X |
| 3,344,081 | 9/1967 | Elyard et al. | 252—301.1 |
| 3,374,178 | 3/1968 | May et al. | 252—301.1 |
| 3,263,004 | 7/1966 | Bean | 264—0.5 |

OTHER REFERENCES

Budnikov et al.; "Proceedings of the 2nd United Nations International Conference on the Peaceful Uses of Atomic Energy," Geneva, 1958, vol. 6, p. 129.

Roberts et al.: "Proceedings of the 2nd United Nations International Conference on the Peaceful Uses of Atomic Energy," Geneva, 1958, vol. 28, p. 220.

Belle: Uranium Dioxide:Properties and Nuclear Applications, 1961, USAEC Pub., pp. 164, 166–168, 174, 175.

Lay: "Grain Growth in $UO_2$–$Al_2O_3$ in the Presence of a Liquid Phase," Nuc. Sci. Abst., vol. 22, No. 21, p. 4657, November 1968.

CARL D. QUARFORTH, Primary Examiner

R. L. TATE, Assistant Examiner

U.S. Cl. X.R.

252—301.1 R